US009459930B1

(12) United States Patent
Adogla

(10) Patent No.: US 9,459,930 B1
(45) Date of Patent: Oct. 4, 2016

(54) DISTRIBUTED COMPLEMENTARY WORKLOAD SCHEDULING

(75) Inventor: Eden G. Adogla, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 911 days.

(21) Appl. No.: 13/283,455

(22) Filed: Oct. 27, 2011

(51) Int. Cl.
*G06F 9/46* (2006.01)
*G06F 9/52* (2006.01)

(52) U.S. Cl.
CPC ........................................ *G06F 9/52* (2013.01)

(58) Field of Classification Search
None
See application file for complete search history.

(56) References Cited

U.S. PATENT DOCUMENTS

| | | | | |
|---|---|---|---|---|
| 5,504,894 A * | 4/1996 | Ferguson | ............... | G06F 9/5083 |
| 6,263,359 B1 * | 7/2001 | Fong | ..................... | G06F 9/4881 |
| | | | | 718/100 |
| 6,304,906 B1 * | 10/2001 | Bhatti | ................. | H04L 12/2856 |
| | | | | 370/395.43 |
| 6,859,926 B1 * | 2/2005 | Brenner | ................ | G06F 9/5038 |
| | | | | 718/100 |
| 8,156,502 B1 * | 4/2012 | Blanding | .................. | G06F 9/50 |
| | | | | 718/100 |
| 9,021,094 B1 * | 4/2015 | Zhou | ........................ | G06F 9/50 |
| | | | | 709/203 |
| 2003/0036886 A1 * | 2/2003 | Stone | .................. | G06F 11/0715 |
| | | | | 702/188 |
| 2003/0189945 A1 * | 10/2003 | Connor | ............... | H04L 49/9057 |
| | | | | 370/419 |
| 2003/0204439 A1 * | 10/2003 | Cullen, III | ..... | G06Q 10/063112 |
| | | | | 705/7.14 |
| 2004/0044718 A1 * | 3/2004 | Ferstl | .................... | G06F 9/5044 |
| | | | | 709/200 |
| 2004/0225631 A1 * | 11/2004 | Elnaffar | ................ | G06F 9/5083 |
| 2006/0152756 A1 * | 7/2006 | Fellenstein | ............ | G06Q 40/04 |
| | | | | 358/1.15 |
| 2006/0271544 A1 * | 11/2006 | Devarakonda | ........ | G06F 9/5027 |
| 2007/0061290 A1 * | 3/2007 | Brown | .............. | G06F 17/30286 |
| 2007/0233291 A1 * | 10/2007 | Herde | .................... | G06Q 10/02 |
| | | | | 700/91 |
| 2008/0082983 A1 * | 4/2008 | Groetzner | ............. | G06F 9/5083 |
| | | | | 718/105 |
| 2008/0172673 A1 * | 7/2008 | Naik | ....................... | G06F 9/505 |
| | | | | 718/104 |
| 2008/0221941 A1 * | 9/2008 | Cherkasova | ............ | G06F 9/505 |
| | | | | 718/106 |
| 2009/0083737 A1 * | 3/2009 | Ben-Yehuda | ....... | G06F 11/3409 |
| | | | | 718/100 |
| 2009/0106763 A1 * | 4/2009 | Zhong | ................... | G06F 9/5027 |
| | | | | 718/104 |

(Continued)

*Primary Examiner* — Emerson Puente
*Assistant Examiner* — Mehran Kamran
(74) *Attorney, Agent, or Firm* — Lee & Hayes, PLLC

(57) ABSTRACT

In a multiple computer environment, workloads are classified as first-class or second-class, depending on their priorities. The workloads are profiled to determine computer capabilities that they are expected to use. Based upon this information, second-class workloads are chosen for execution alongside first-class workloads in such a way that the expected capabilities used by the first-class and second-class workloads are complementary.

16 Claims, 4 Drawing Sheets

(56) References Cited

U.S. PATENT DOCUMENTS

| | | | | |
|---|---|---|---|---|
| 2010/0043004 | A1* | 2/2010 | Tambi | G06F 11/3433 718/103 |
| 2010/0153958 | A1* | 6/2010 | Richards | G06F 9/5083 718/104 |
| 2010/0275241 | A1* | 10/2010 | Srinivasan | G06F 9/468 726/1 |
| 2011/0040540 | A1* | 2/2011 | Yoon | G06Q 10/06 703/6 |
| 2011/0167112 | A1* | 7/2011 | Mazzucco | G06F 9/505 709/203 |
| 2011/0252248 | A1* | 10/2011 | Cameron | G06Q 50/06 713/300 |
| 2011/0270968 | A1* | 11/2011 | Salsburg | G06F 9/5072 709/224 |
| 2011/0320233 | A1* | 12/2011 | Arnette | G06F 9/4881 705/7.15 |
| 2012/0026534 | A1* | 2/2012 | Uruma | H04N 1/0035 358/1.14 |
| 2012/0290725 | A1* | 11/2012 | Podila | G06F 9/5011 709/226 |
| 2012/0311138 | A1* | 12/2012 | Inamdar | G06F 11/3404 709/224 |
| 2012/0317249 | A1* | 12/2012 | Salsburg | G06F 9/5072 709/220 |
| 2012/0331135 | A1* | 12/2012 | Alon | H04L 41/044 709/224 |
| 2014/0172954 | A1* | 6/2014 | Salsburg | H04L 67/10 709/203 |

* cited by examiner

DISTRIBUTED COMPLEMENTARY WORKLOAD SCHEDULING

BACKGROUND

It has become common for various types of online service providers to implement data centers having large numbers of computers and associated resources. In some situations, a data center may be built to provide particular services that are associated with a website or entity. In other situations, a data center may support a number of services that are associated with various websites and different entities. In some situations, network-accessible data centers may provide relatively low level computing resources that can be utilized by developers for various purposes on a pay-per-use basis.

A data center consists of a large number of similar or identical computers, which can communicate with each other and with other devices over a network. The network may include a local-area network and/or a wide-area network such as the Internet. The computers may be treated as fungible, with different jobs or workloads being dynamically assigned to available computers.

As data centers have grown in size, power costs and other costs have become increasing concerns. As a result, finding ways to efficiently use all available computing resources has become important.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for efficiently utilizing computer resources within a data center or other environment in which workloads are distributed among or assigned to multiple computer or server instances.

Available workloads are categorized as first-class or second-class workloads. First-class workloads are those having relatively high priorities, and second-class workloads have relatively lower priorities. First-class workloads are assigned to individual computers in a normal fashion. Second-class workloads are evaluated or profiled to determine the computer capabilities and resources they might utilize, and are assigned to computers that are not utilizing those capabilities or resources.

In particular, a pool of second-class workloads is maintained, where the computer capabilities used by the second-class workloads are approximately known. The first-class workloads and the computers executing the first-class workloads are profiled and/or observed to determine the computer capabilities that are left unused by the first-class workloads. Based on this information, second-class workloads are identified and assigned to different computers, so that the second-class workloads utilize computer capabilities that are complementary to those used by the first-class workloads.

Accordingly, an individual computer may be executing both a first-class workload and one or more complementary second-class workloads. Performance may be monitored during execution of the workloads to determine whether the second-class workloads interfere with the first-class workload. If there is any such interference, the second-class workload may be terminated and/or reassigned.

Figure 1:
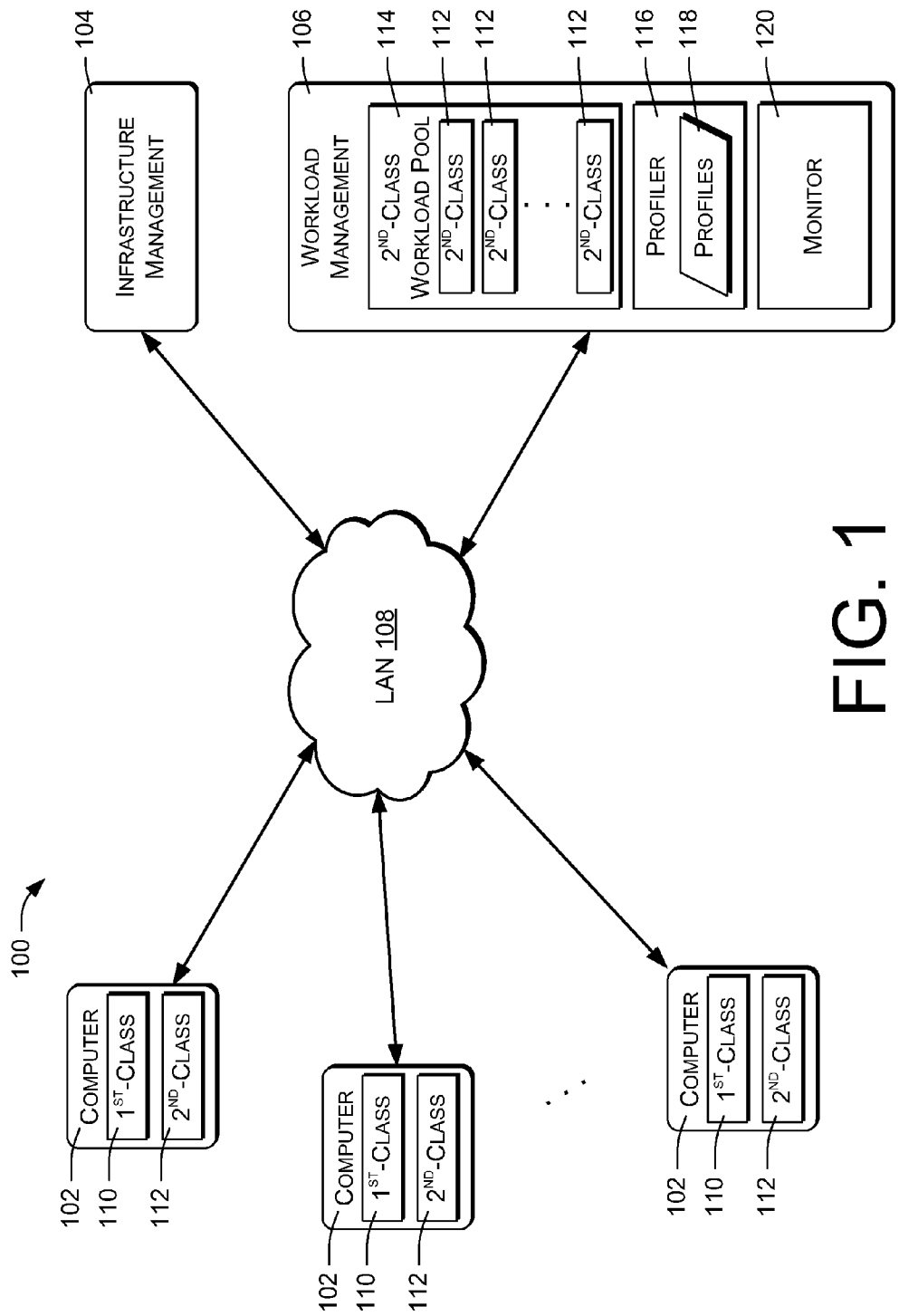
FIG. 1 is a block diagram illustrating a system and environment executing different classes of workloads.

FIG. 1 shows an example environment 100 in which the described techniques may be implemented. The environment 100 includes a plurality of computers 102, which may comprise physical machines, virtual machines, servers, and other networkable devices capable of executing workloads.

The computers 102 may be managed by an infrastructure management system 104, which may comprise one or more supervisory computers and/or software components. The infrastructure management system 104 may provide provisioning, network configuration, workload assignment, and so forth for the computers 102 under its management.

The environment 100 may also have a workload management system 106, which may be responsible for evaluating or profiling workloads and for assigning them to different computers for execution. The workload management system 106 may operate in conjunction with the infrastructure management system 104 to distribute and assign workloads.

The infrastructure management system 104 and the workload management system 106 may communicate with each other and with the managed computers 102 through a network 108, which may be a local-area or wide-area network.

The infrastructure management system 104 and the workload management system 106 are illustrated as two discrete components only for purposes of discussion. In actual embodiment, the various functionality described below may be performed by one or a plurality of components, and different management responsibilities may be distributed between various functional components in many different ways.

In the illustrated example of FIG. 1, each of the computers 102 may execute various workloads as assigned by the infrastructure management system 104 and/or the workload management system 106. The workloads may have varying priorities. For purposes of discussion, workloads are referred to herein as first-class workloads 110 and second-class workloads 112.

First-class workloads are jobs or workloads having relatively high priorities. In an Infrastructure-as-a-Service (IaaS) environment, these may be workloads that are to be executed on behalf of paying customers, and for which service level agreements or requirements have been granted.

Second-class workloads are jobs or workloads having relatively low priorities. They may be jobs having lower-level service requirements. In an IaaS environment, they may comprise jobs for which relatively lower fees have been paid. Furthermore, the second-class workloads may be workloads that can be terminated and restarted, and/or which do not need to respond to events in real time.

Each of the computers 102 is typically assigned one or more primary or first-class workloads 110. In addition, each of the computers 102 may execute one or more of the second-class workloads 112. As will be described in more detail below, the workload management system 106 selects different computers 102 to execute respective second-class workloads 112, depending on the unused capabilities of the computers 102 and the capabilities that are expected to be used by the second-class workloads 112. The term "capabilities" as used herein is intended to encompass functionality, resources, features, capacities, and so forth.

In the illustrated example of FIG. 1, the workload management system 106 maintains a second-class workload pool 114, containing or specifying a plurality of second-class workloads 112 that are to be executed by the computers 102. The second-class workloads within the pool 114 are dynamically assigned by the workload management system 106 to individual computers 102 for execution, as will be described in more detail below.

The workload management system 106 may implement or work in conjunction with a profiler 116. The profiler 116 may be configured to evaluate workloads, including the first-class workloads 110 and the second-class workloads 112, to determine computer capabilities that are used by the workloads as well as computer capabilities that are unused by the workloads. Capabilities that are used and/or unused by different types of workloads are indicated by a plurality of capability profiles 118.

The workload management system 106 may also implement or work in conjunction with a monitor 120 that is configured to monitor performance of the computers 102, particularly with respect to their execution of first-class workloads 110. The monitor 120 may work in conjunction with software executing on the individual computers 102.

Figure 2:
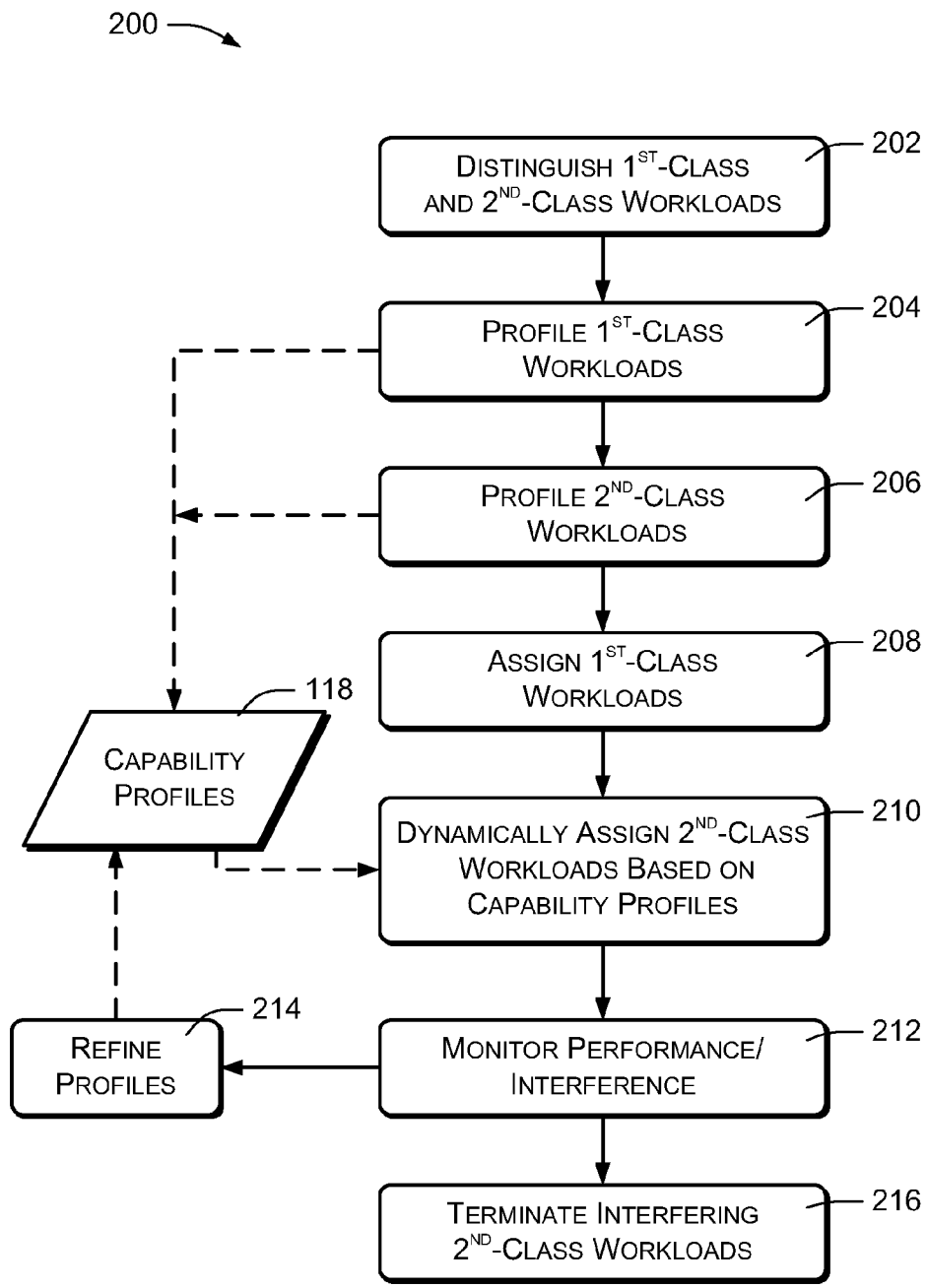
FIG. 2 is a flow diagram illustrating an example method of assigning first-class and second-class workloads in the environment of FIG. 1.

FIG. 2 illustrates a method 200 of managing workloads in an environment such as that shown by FIG. 1. An action 202 comprises distinguishing or identifying first-class and second-class workloads. As mentioned above, first-class workloads may comprise workloads having relatively higher-level service expectations, such as mission-critical workloads, workloads that are expected to respond in real time, and so forth. In an IaaS environment, first-class workloads may comprise applications and application components that are to be executed on behalf of developers, for which a fee has been paid, and/or for which specific service level agreements or expectations have been issued or agreed upon.

Second-class workloads may comprise workloads having relatively lower-level service expectations, such as non-mission-critical workloads, and other workloads that may be terminated, interrupted and/or restarted without disrupting service offerings. In an IaaS environment, second-class workloads may comprise applications and application components for which no fees have been paid or for which relatively lower feeds have been paid, and/or for which there are relatively low or no service-level expectations.

An action 204 comprises profiling the first-class workloads to determine computer capabilities that are used and/or unused by respective first-class workloads. Capabilities may include various types of resources and capacities. Capabilities may be evaluated in terms of specific data processing features and/or characteristics, such as rate of processing, storage capacity, network bandwidth, data transfer/storage rate, number of CPUs, types of available processing units, CPU utilization, size of memory, latency, and so forth. As an example, a particular type of workload may be designed to perform stress testing or burn-in of a hard disk. A workload of this type might use relatively little of a computer's available CPU, but might use a high percentage of available disk-based storage resources. Another type of workload might utilize relatively high amounts of CPU time, but have little need for disk-based storage resources. Other types of stress testing, such as CPU burn-in, network stress tests, and so forth, are examples of first-class workloads that may leave capabilities of a computer available for other uses.

The profiling 204 can be based on specifications supplied by developers or analysts, or can be based on automated observations about executing workloads. First-class workloads, in particular, may be observed during their execution to determine which computer capabilities are left available on the computers that are executing the first-class workloads. It might be noted, for example, that a particular type of first-class workload does not use graphics capabilities of a computer, or that another type of workload does not use significant network bandwidth. In some embodiments, the computer capabilities used by a particular workload may be identified based on service level expectations or agreements that have been agreed upon with respect to the workload.

An action 206 comprises profiling second-class workloads to determine computer capabilities that are expected to be used by the second-class workloads. Capabilities used by second-class workloads can be quantified in the same way as the used or unused capabilities of first-class workloads, in terms of various computation resources and performance indexes.

The profiling 206 can be performed by specification or by observation. In some situations, the computer capabilities used by a particular workload may be identified based on service level expectations or agreements that have been agreed upon with respect to the workload.

The profiling 204 and 206 may generate the capability profiles 118, corresponding respectively to different types of workloads. Each capability profile 118 may indicate capabilities used and/or unused by the corresponding type of workload.

The profiling 206 may be performed with respect to individual workloads maintained in the second-class workload pool 114, or to different types of workloads within the workload pool 114.

An action 208 comprises assigning first-class workloads to respective computers, and executing the first-class workloads on the respective computers to which they have been assigned. This may be performed arbitrarily by the infrastructure management system 104, by assigning a first-class workload to each available computer, or by some other methodology. In some situations, there may be available computers having different capabilities, and certain first-class workloads might be more appropriately assigned to certain computers.

An action 210 comprises dynamically assigning individual second-class workloads to different computers based on their corresponding capability profiles 118 and on the unused capabilities of the computers that are executing the first-class workloads. The action 210 may include comparing capability profiles 118 of first-class and second-class workloads, to locate pairs of first-class and second-class workloads that use complementary or mutually exclusive sets of computer capabilities. It may also be performed by observing computers that are executing first-class workloads to determine unused capabilities of the computers, and locating second-class workloads that utilize those otherwise unused capabilities.

After assigning one or more second-class workloads to computers that are also executing first-class workloads, an action 212 comprises monitoring the performance of the computers, which may be executing both first-class and second-class workloads. The action 212 may comprise monitoring the performance of the executing first-class workloads to determine whether they are being interfered with by the second-class workloads that are executing on the same computers.

The monitoring 212 may be performed with respect to performance objectives or expectations that have been specified with respect to the first-class workloads, such as with respect to service level agreements or expectations that have been associated with the first-class workloads. As an example, a particular first-class workload may be expected to respond to data requests with no more than a specified latency. As another example, another first-class workload may be expected to perform disk writes at a specified rate. When performance of the first-class workload does not meet the specified objectives, it is assumed that the second-class workload is interfering with the first-class workload.

The monitoring 212 may also be used to perform an action 214 of refining existing capability profiles associated with different types of workloads. Furthermore, the monitoring 212 may detect that a certain type of second-class workload consistently interferes with a certain type of first-class workload, and this fact may be recorded in the capability profiles 118 of the two types of workloads so that they will not be assigned to the same computer in the future.

An action 216 may comprise terminating any second-class workload that is interfering with a first-class workload. Any terminated second-class workloads may be placed back in the second-class workload pool 114, for eventual reassignment to another computer.

The actions of FIG. 2 are performed repetitively, to profile workloads or to identify existing capability profiles for newly pending workloads, to assign first-class workloads, to assign second-class workloads as they become available and as appropriate computers become available, to monitor for interference with first-class workloads, and to terminate or reassign any second-class workloads that are producing interference.

Although profiling actions are illustrated by blocks 204 and 206 as discrete actions, the profiling of both first-class and second-class workloads may be performed in various times and in various ways. For instance, different types of workloads may be profiled in a separate process, performed strictly for the purpose of profiling. Alternatively, profiling may be performed by observing the workloads during their normal execution, and noting computer capabilities that are used and/or unused. In many embodiments, a particular type of workload is performed repetitively, and the capability profile of a newly-received workload may be identified by identifying similar or identical types of workloads that have previously been profiled and/or executed. In other words, the system may compile information indicating the capability profiles of different types of workloads, and the capability profile of a newly-received workload may be identified by referring to this previously compiled information. The illustrated capability profiles 118 may represent such compiled information.

Rather than profiling first-class workloads, it may be possible in some embodiments to simply observe unused capabilities of a computer while it is executing a particular first-class workload, and to assign a second-class workload based on this information in combination with a capability profile corresponding to the second-class workload.

Figure 3:
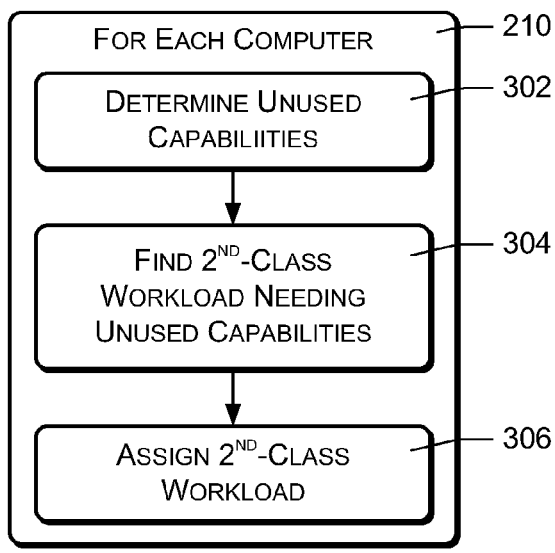
FIG. 3 is a flow diagram showing an example implementation of the action 210 of FIG. 2.

FIG. 3 shows an example implementation of the action 210 of dynamically assigning second-class workloads to respective computers. The actions within the block 210 may be performed with respect to multiple computers of a data center or other computer deployment.

An action 302 comprises determining unused capabilities of a particular computer that is executing a first-class workload. This may be performed by comparing the capability profile 118 corresponding to the type of the first-class workload with known capabilities of the computer. Alternatively, it may be performed by monitoring the computer and observing which resources it is not using.

An action 304 comprises finding or identifying one of the profiled second-class workloads that has been profiled as utilizing computer capabilities corresponding to the unused capabilities of the computer currently being considered. In some embodiments, this may be accomplished by examining the capability profiles 118, which have been associated with different types of second-class workloads, and finding a second-class workload type having an appropriate capability profile 118. Once found, a second-class workload of this type may be selected from the second-class workload pool 114 and assigned to the computer in an action 306, whereupon the assigned-to computer executes the assigned second-class workload.

Figure 4:
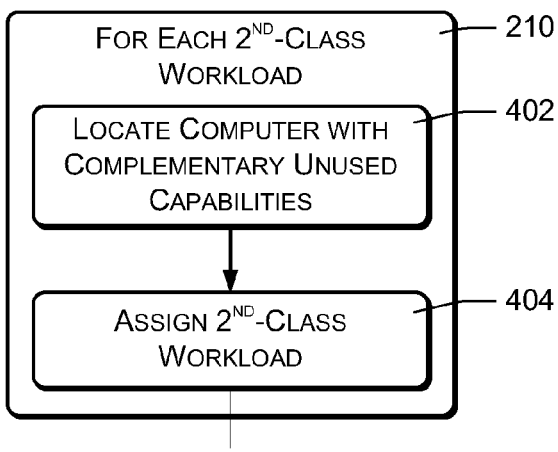
FIG. 4 is a flow diagram showing another example implementation of the action 210 of FIG. 2.

FIG. 4 illustrates another example implementation of the action 210 of dynamically assigning second-class workloads to respective computers. The actions within the block 210 may be performed with respect to multiple pending second-class workloads, such as may be maintained in the workload pool 114. An action 402 comprises locating a computer having unused capabilities corresponding to the capabilities expected to be used by the second-class workload currently being considered. This may be performed by comparing the capability profile 118 of the second-class workload to the capability profiles 118 of executing first-class workloads. Alternatively, it may be performed by comparing the capability profile 118 of the second-class workload to observed unused capabilities of the computers.

An action 404 comprises assigning the second-class workload to the located computer, and executing the second-class workload on the located computer along with the already executing first-class workload.

Figure 5:
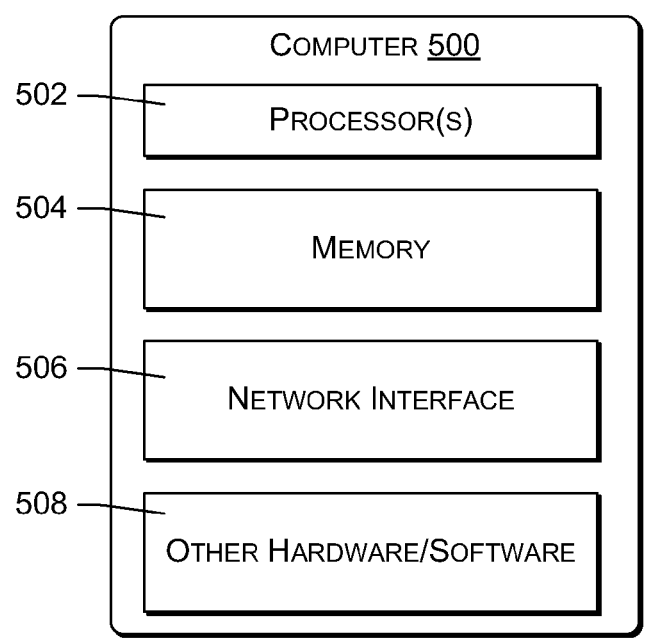
FIG. 5 is a block diagram showing high-level components of an example computer that may be configured and programmed to implement portions of the functionality described herein.

FIG. 5 illustrates relevant components of an example computer configuration that may be used to implement aspects of the functionality described above, including functionality attributed above to the computers 102, infrastructure management system 104, workload management system 106, profiler 116, monitor 120, and forth. Generally, a server, service, client, browser, etc. may be implemented by one or more computers such as this, with the various functionality described above distributed in various ways. In the case of an infrastructure service or other type of data center, server computers such as this may be located together or separately, and organized as virtual servers, server banks, and/or server farms. The described functionality may be provided by the computers of a single entity or enterprise, or may utilize the servers, computers, and/or services of multiple entities or enterprises.

In a very basic configuration, an example computer 500 might comprise a processing unit 502 composed one of one or more processors, and memory 504. The memory 504 may comprise computer storage media and may include volatile and nonvolatile memory. Thus, the memory 504 may include, but is not limited to, RAM, ROM, EEPROM, flash memory, or other memory technology, or any other medium which can be used to store media items or applications and data which can be accessed by the computer 500.

The memory 504 may be used to store any number of functional components that are executable on the processing unit 502, as well as data that is used by the functional components. Functionality components (not shown) may include an operating system, a web services component, application program interfaces (APIs) and various other components as may be appropriate to implement the functionality described above.

The server 500 may of course include many logical, programmatic, and physical components, of which those shown in FIG. 5 are merely examples that are related to the discussion herein. As an example, the server 500 may have a network interface 506 for communicating over the network 108. Other hardware and software components of the server 500 are represented by block 508 of FIG. 5, and may include the usual components of a network-based computer or server.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    under control of one or more processors configured with executable instructions,
    classifying available workloads as being at least one of first-class workloads or second-class workloads based at least partly on one or more previously agreed upon service-level expectations for individual ones of the available workloads;
    profiling the first-class workloads to determine first computer capabilities that are expected to be unused by the first-class workloads;
    profiling the second-class workloads to determine second computer capabilities that are expected to be used by the second-class workloads;
    executing a selected first-class workload of the first-class workloads on a computer;
    based at least in part on the profiling of the first-class workloads and the second-class workloads, determining a selected second-class workload of the second-class workloads that is expected to use at least one first computer capability of the first computer capabilities that is expected to be unused by the selected first-class workload;
    executing the selected second-class workload on the computer while executing the selected first-class workload;
    determining that the execution of the selected second-class workload interferes with the selected first-class workload;
    terminating execution of the selected second-class workload based at least in part on the determining that the execution of the selected second-class workload interferes with the selected first-class workload; and
    modifying a capability profile of the selected first-class workload to indicate an incompatibility between the selected first-class workload and the selected second-class workload based at least in part on the determining that the execution of the selected second-class workload interferes with the selected first-class workload.

2. The method of claim 1, further comprising maintaining a pool of the second-class workloads for execution by different computers depending at least partly on the first computer capabilities that are expected to be unused when executing different first-class workloads.

3. The method of claim 1, further comprising dynamically assigning different second-class workloads to different computers depending at least partly on the first computer capabilities that are expected to be unused when executing different first-class workloads.

4. The method of claim 1, further comprising terminating execution of the selected second-class workload based at least partly on a determination that the selected second-class workload interferes with the selected first-class workload.

5. The method of claim 1, further comprising refining the profiling of the first-class workloads and the second-class workloads during the executing of the selected first-class workload and the second-class workload.

6. The method of claim 1, wherein the first-class workloads comprise one of applications or application components that are to be executed on behalf of a developer for which a fee has been paid.

7. A computer-implemented method of utilizing computer resources, comprising:
    under control of one or more processors configured with executable instructions,
    classifying available workloads as being at least one of first-class workloads or second-class workloads depending at least partly on service-level expectations associated with at least one of the first-class workloads or the second-class workloads;
    executing a first-class workload of the first-class workloads on a computer;
    determining unused capabilities of the computer that is executing the first-class workload;
    maintaining a pool of the second-class workloads;
    selecting the computer to execute a second-class workload of the pool of second-class workloads, wherein the second-class workload is expected to use the unused capabilities of the computer during execution of the first-class workload;
    executing the second-class workload on the computer;
    determining that execution of the second-class workload interferes with the first-class workload that is executing on the computer;

terminating execution of the second-class workload based at least in part on the determining that the execution of the second-class workload interferes with the first-class workload; and modifying a capability profile of the first-class workload to indicate an incompatibility between the first-class workload and the second-class workload based at least in part on the determining that the execution of the second-class workload interferes with the first-class workload.

8. The method of claim 7, further comprising selecting different computers to execute respective second-class workloads depending at least partly on the unused capabilities of the computer and the computer capabilities expected to be used by the second-class workload.

9. The method of claim 7, further comprising profiling the pool of second-class workloads to identify the computer capabilities that are expected to be used by the second-class workload.

10. The method of claim 7, wherein the computer capabilities are first computer capabilities, and further comprising profiling the first-class workloads to identify second computer capabilities that are expected to be unused by the first-class workloads.

11. One or more non-transitory computer-readable media containing instructions executed by one or more processors to perform actions comprising:

classifying available workloads as being at least one of first-class workloads or second-class workloads depending at least partly on service-level agreements associated with at least one of the first-class workloads or the second-class workloads;

identifying first computer capabilities that are expected to be unused by individual computers of a pool of computers that are executing the first-class workloads;

identifying second computer capabilities expected to be used by individual ones of the second-class workloads of a pool of second-class workloads;

for an individual second-class workload of the pool of second-class workloads, selecting a computer of the pool of computers to execute the individual second-class workload, the computer having a first computer capability of the first computer capabilities that includes a second computer capability expected to be used by the individual second class workload;

executing the second-class workload on the computer;

terminating execution of the individual second-class workload based at least in part on determining that the execution of the individual second-class workload interferes with an individual first-class workload executing on the computer; and modifying a capability profile of the individual first-class workload to indicate an incompatibility between the first-class workload and the second-class workload based at least in part on the determining that the execution of the individual second-class workload interferes with the individual first-class workload.

12. The one or more non-transitory computer-readable media of claim 11, the actions further comprising dynamically assigning different second-class workloads to different computers of the pool of computers depending at least partly on the second computer capabilities expected to be used by the individual ones of the second-class workloads.

13. The one or more non-transitory computer-readable media of claim 11, the actions further comprising dynamically assigning different second-class workloads to different computers of the pool of computers depending at least partly on the first computer capabilities that are expected to be unused by individual computers of the pool of computers.

14. The one or more non-transitory computer-readable media of claim 11, the actions further comprising observing the individual second-class workload during execution to further identify the second computer capability used by the individual second-class workload.

15. The one or more non-transitory computer-readable media of claim 11, the actions further comprising observing the first-class workloads during execution by the pool of computers to further identify the first computer capabilities that are expected to be unused.

16. The one or more non-transitory computer-readable media of claim 11, wherein the first-class workloads comprise one of applications or application components that are to be executed on behalf of a developer for which a fee has been paid.

* * * * *